Figure 11:
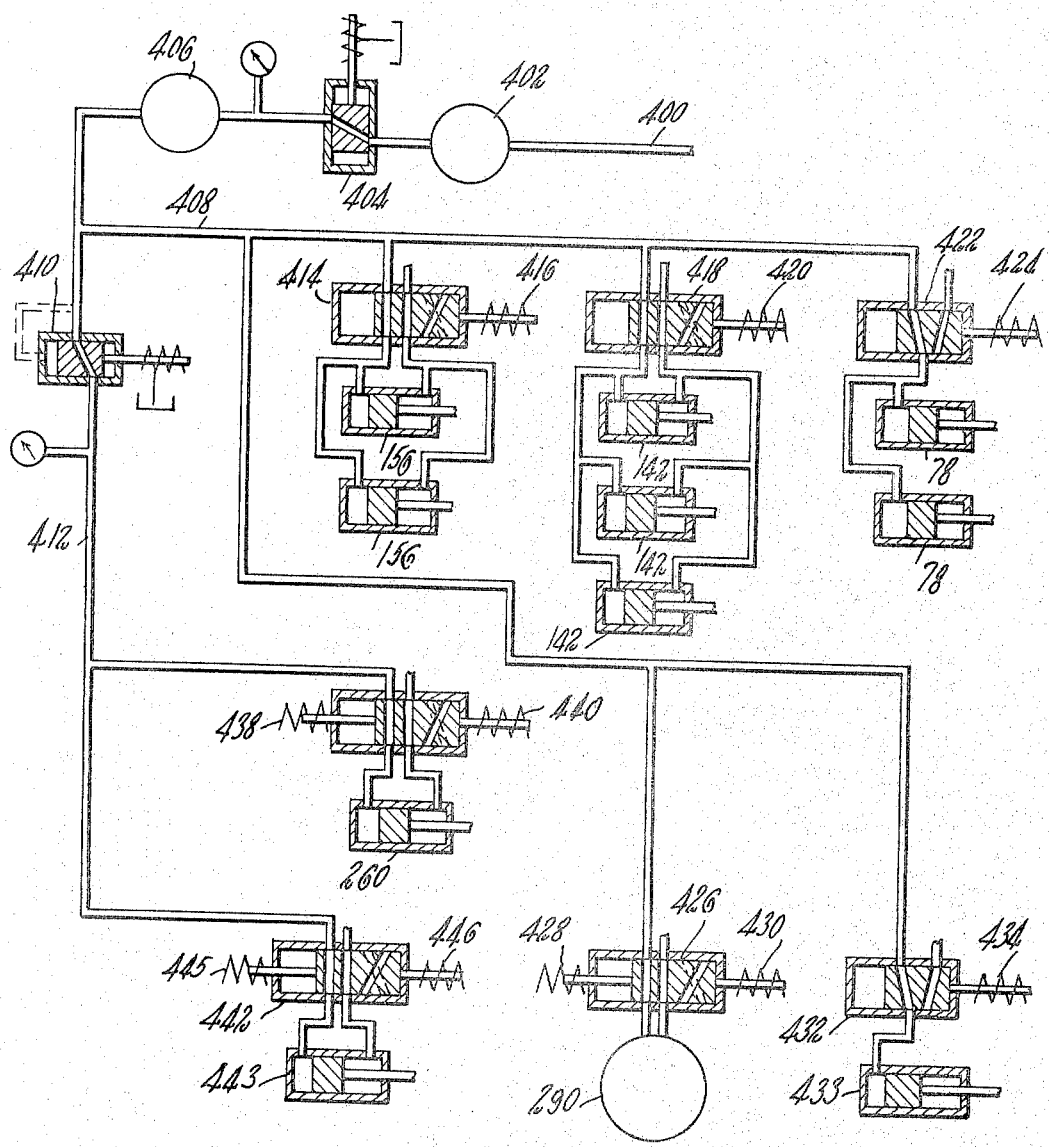

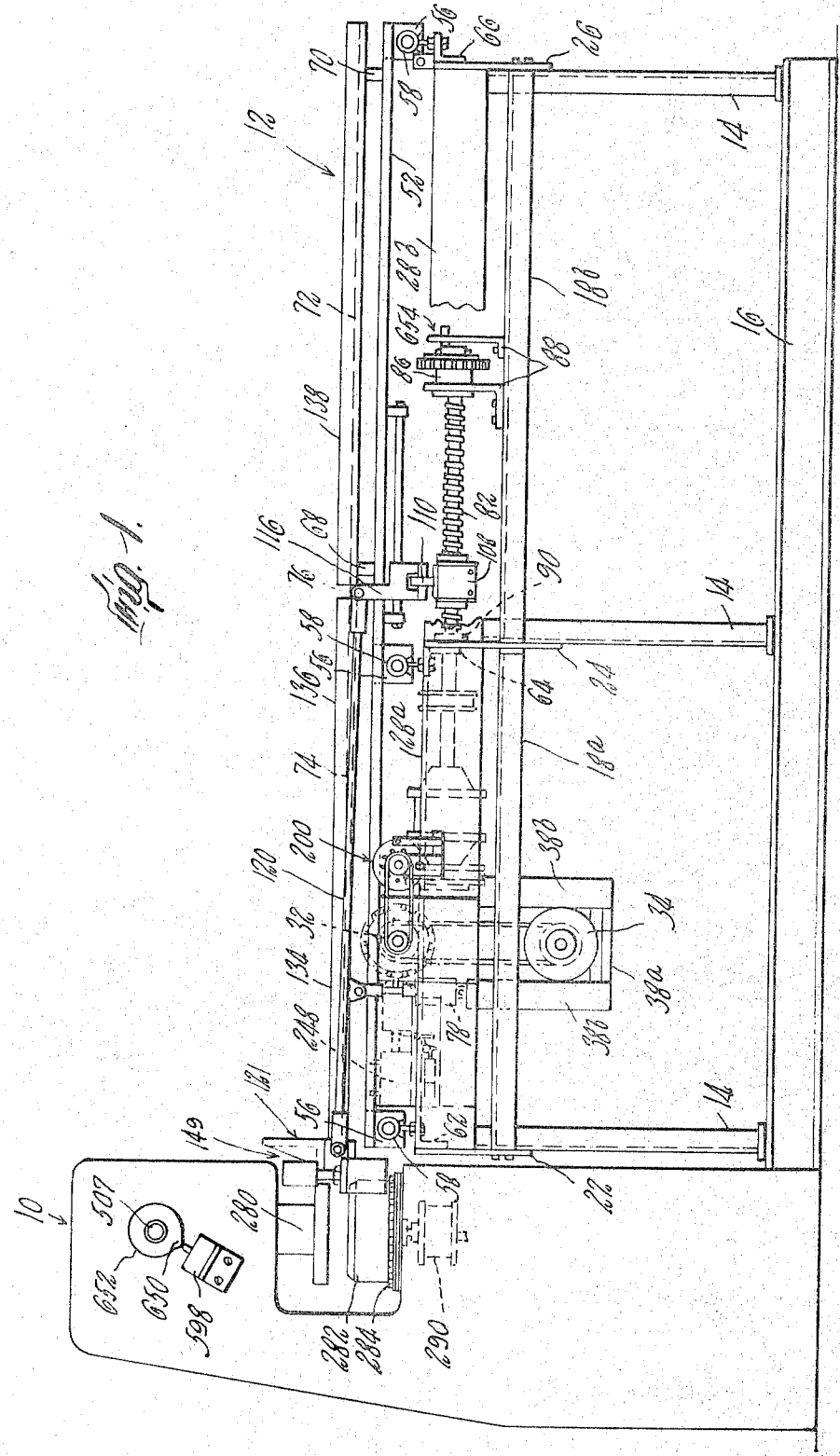

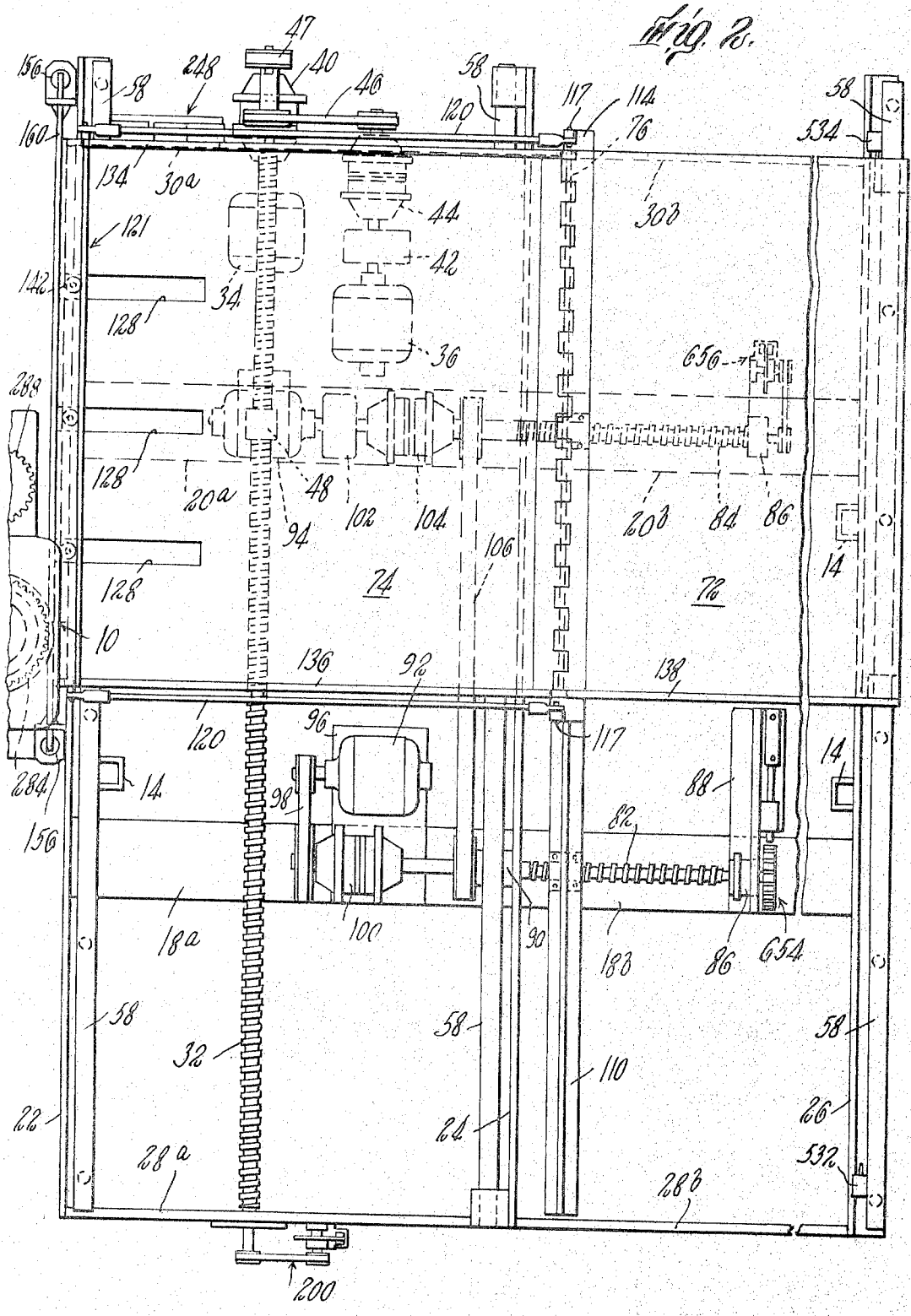

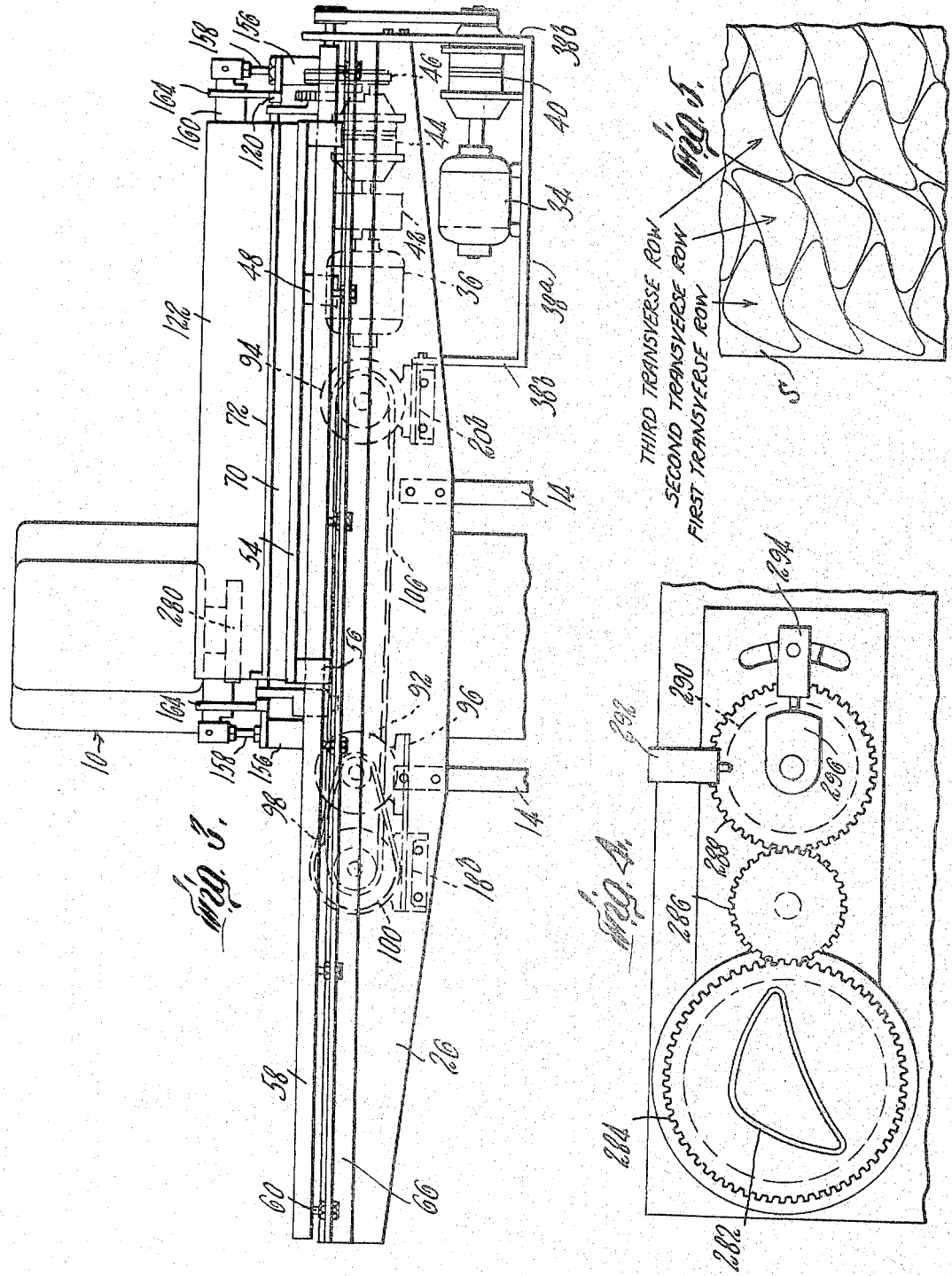

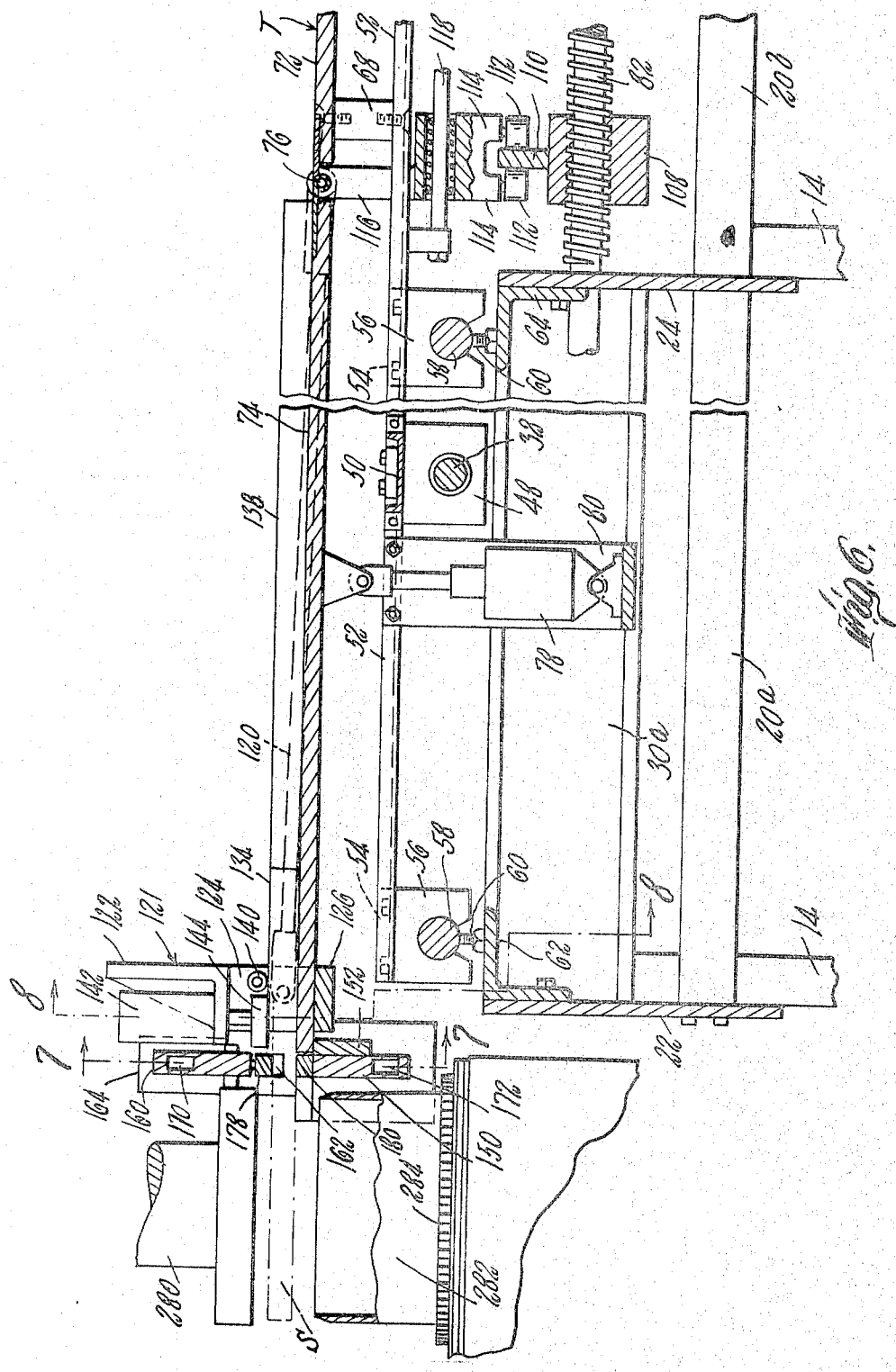

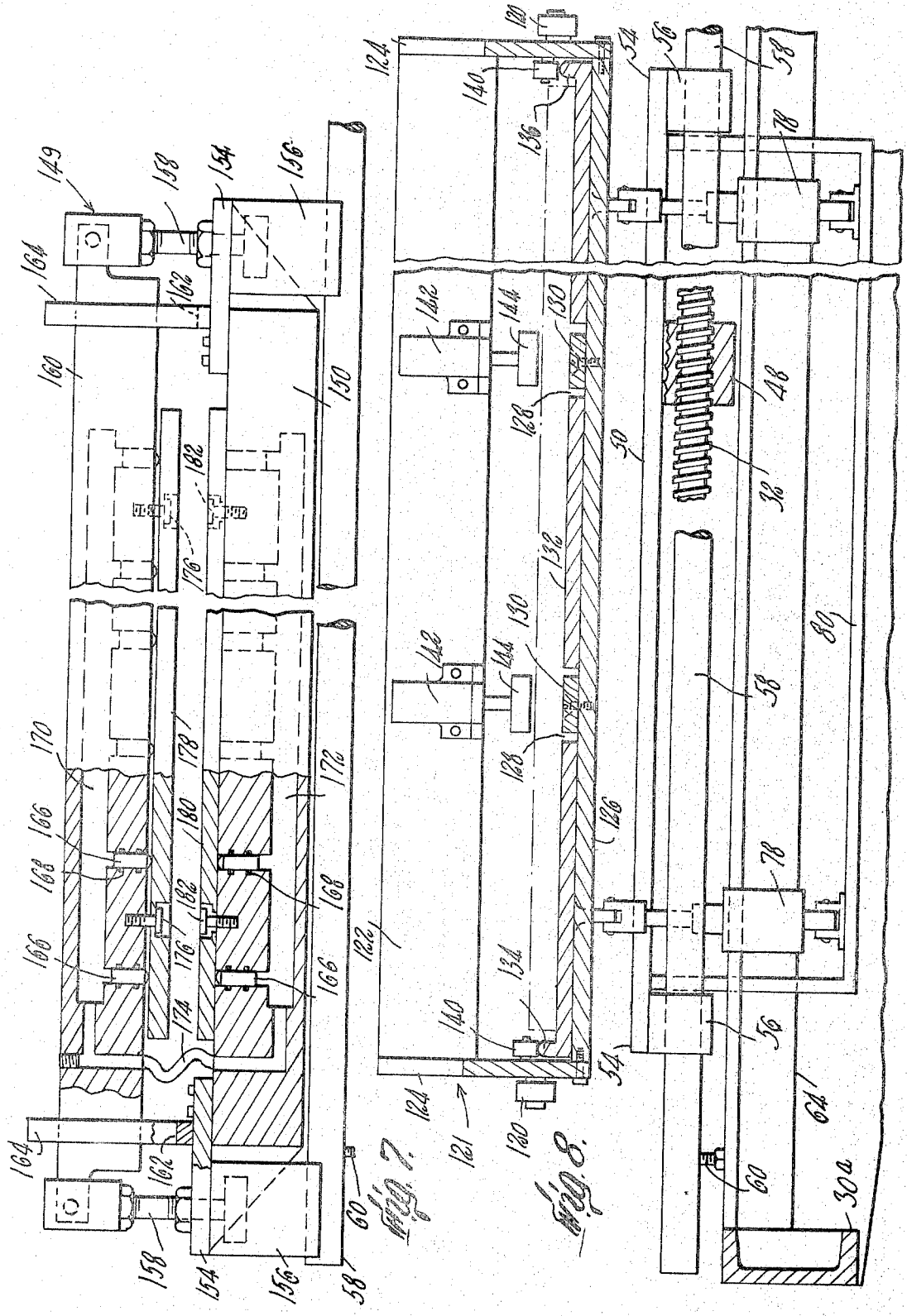

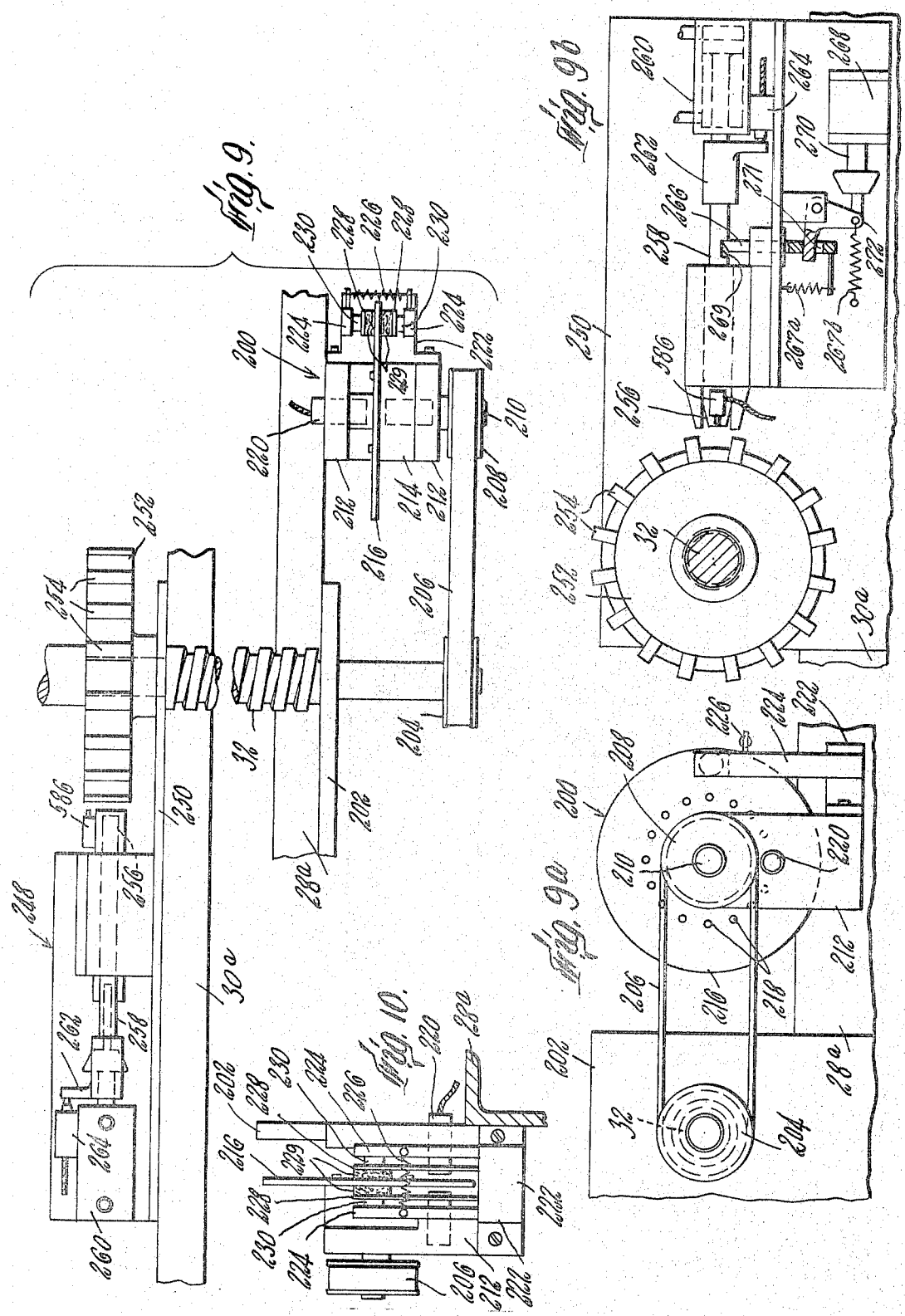

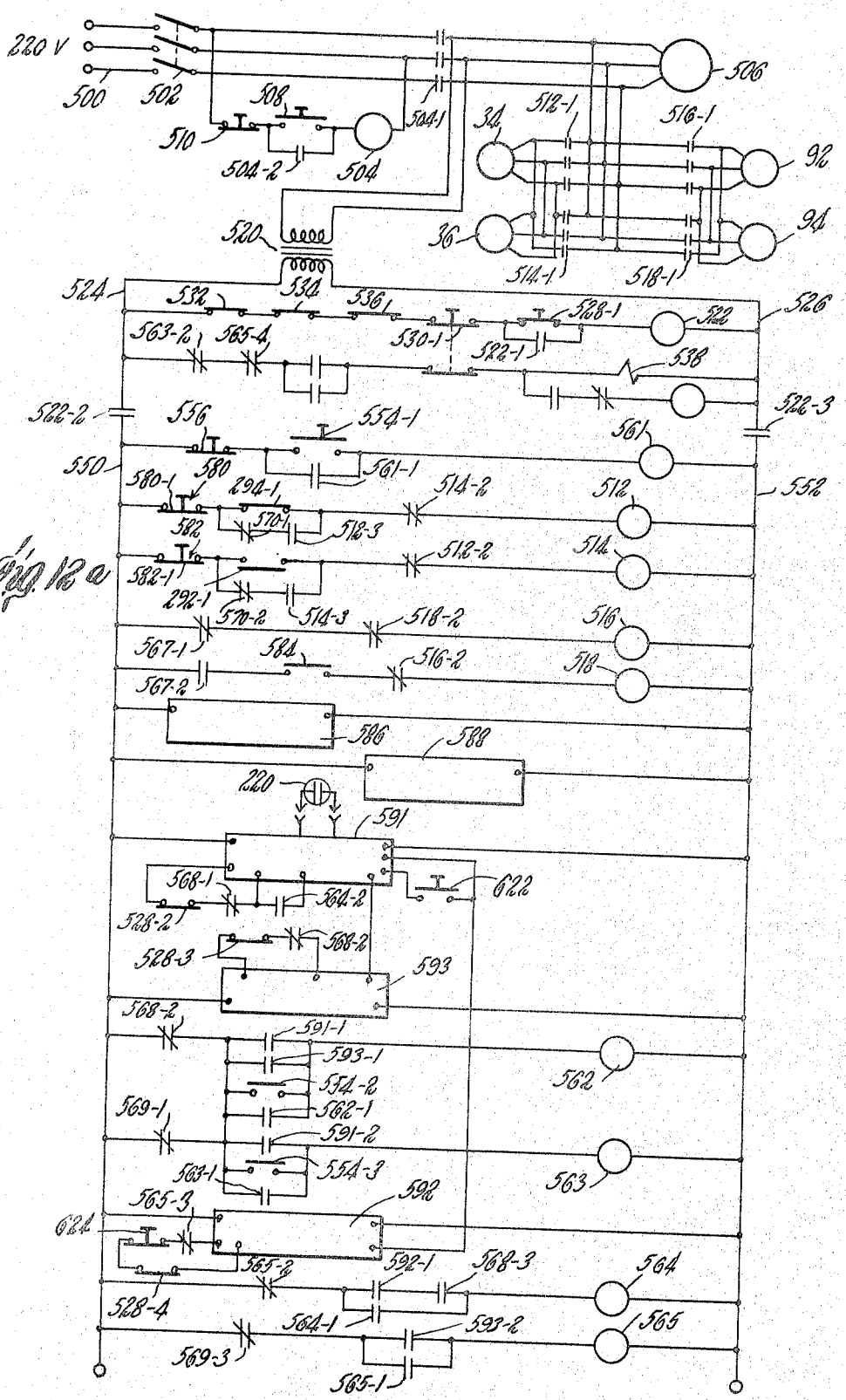

United States Patent Office 3,336,826
Patented Aug. 22, 1967

3,336,826
SEQUENTIAL PATTERNED POSITIONING USEFUL IN MANUFACTURING FABRIC SHOE BOX TOE BLANKS
Wilbur L. Sheffield, Westwood, Mass., assignor to Bixby Box Toe Company, Inc., Haverhill, Mass., a corporation of Massachusetts
Filed Mar. 18, 1964, Ser. No. 352,900
18 Claims. (Cl. 83—219)

This invention relates to apparatus for the sequential, predeterminedly patterned, treatment of material. It provides apparatus useful, for example, in cutting out box toe blanks or counters from a stack of large sheets of suitable material.

It is a primary object of the invention to provide apparatus in which a large number of operations, such as operations of a horizontally stationary punch press, may be carried out in sequence on a workpiece, such as a stack of sheets of fabric, fresh portions of which are moved below the mechanism operating on the workpiece. Further objects are to provide such positioning with very great accuracy and yet with great sturdiness, with provision for an operator's overriding input not practical using for example punched card systems; to provide for patterning the successive positions with ease and speed; to provide in preferred embodiments for both longitudinal and transverse repositioning, as well as for staggering positions of one transverse row relative to positions of an adjacent row and varying the spacing between successive longitudinal rows; to provide automatic punching of flat cutouts from for example a stack of sheets of material by moving a flat-bottomed member by means of a punch press against the stack to force the stack against a hollow cutter die, and removing the cutouts down through the die with ease and without interference with apparatus operation; to provide a workpiece support table adjacent said die which thereat moves downwardly as said flat-bottomed member does, so the sheet of the stack being at the time cut by the die is supported by the table through the other sheets therebeneath at a level corresponding generally to the plane defined by the cutting edge of the die to avoid ripping and tearing; to provide novel feed means cooperating with said table and said stack to move said workpiece or a stack of workpieces over said table; to provide novel clamping means for holding a stack against said table near said die without bending despite lack of structural bulk; to provide novel discriminator mechanism to provide accuracy of control without inertial distortion or inaccuracies; and to provide stop mechanism for co-operation with said discriminator mechanism to fix each position with accuracy and at the same time zero out variations so that repositioning following is always from a common base.

Figure 12B:
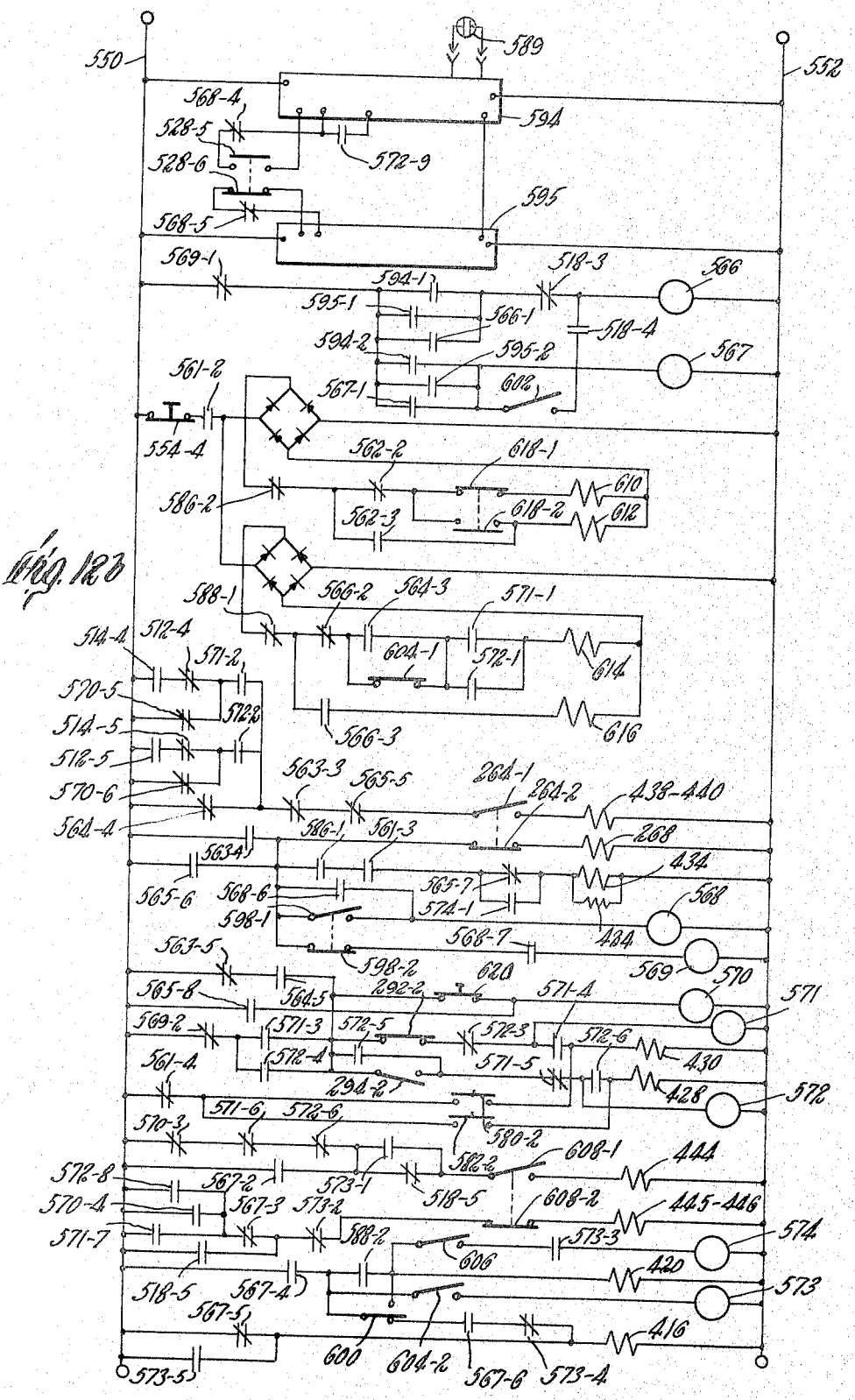
Figure 13:
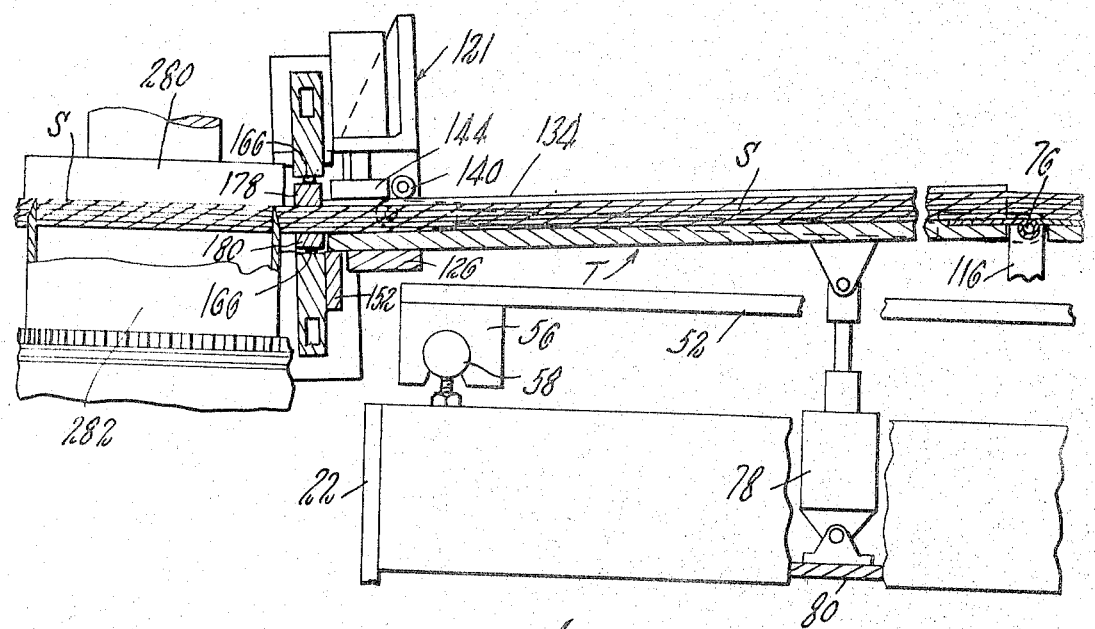

Other objects, advantages, and features will appear from the following description of a preferred embodiment, taken together with the attached drawings, in which:

FIG. 1 is a side elevational view of a presently preferred embodiment of the apparatus;
FIG. 2 is a plan view of the same;
FIG. 3 is a back end elevational view of the same;
FIG. 4 is a partial plan view of the apparatus, showing the die repositioning mechanism;
FIG. 5 is a partial plan view of a stack of sheets showing a series of transverse rows of cuts;
FIG. 6 is an enlarged, broken away, partially in section, side elevational view corresponding to the view of FIG. 1;
FIG. 7 is a partial front end elevational view, partially in section at 7—7 of FIG. 6;
FIG. 8 is a partial front end elevational view, partially in section at 8—8 of FIG. 6;

FIG. 9 is a broken away plan view showing the relationship among a stop mechanism, lead screw, and discriminator mechanism;
FIG. 9a is a side elevational view of said discriminator mechanism;
FIG. 9b is a side elevational view of said stop mechanism;
FIG. 10 is an end elevational view of said discriminator mechanism;
FIG. 11 is a diagram of the pneumatic circuit of the controls for said apparatus;
FIGS. 12a, 12b, and 12c are together a circuit diagram of said controls; and
FIG. 13 is a side elevational view corresponding to FIG. 6, and showing the completion of a cut through a stack of sheets.

Referring now in more detail to the drawings, there is shown in FIG. 1 an apparatus adapted particularly to cutting box toe blanks and counters from a stack of sheets of impregnated fabric. The machine includes a punch press portion, indicated generally at 10, and a positioning portion indicated generally at 12.

The frame of the positioning portion includes legs 14 formed from angle iron and secured on a pair of longitudinally extending I-beams 16. Also extending longitudinally and attached to the legs 14 are structural members 18a and 18b, which are fabricated from downwardly open lengths of channel, and similar longitudinally extending members 20a and 20b. Extending transversely are structural plates 22, 24, and 26, which are secured on legs 14 and structural members 18a, 18b, 20a, and 20b. Extending between plates 22 and 24, and 24 and 26, are respectively inwardly open channel members 28a and 30a, and 28b and 30b.

Extending from member 28a to 30a is transverse lead screw 32, which is ball-bearingly mounted near its opposite ends. Additional support is provided by bearing members secured on, and extending upwardly from, members 18a and 20a. The transverse- or cross-feed lead screw 32 is rotatably driven selectively by high speed motor 34 or slow speed motor 36. The high speed motor 34 is mounted on plate 38a and straps 38b, which are in turn carried by longitudinal channel members 20a and 30a. The slow-speed cross-feed motor 36 is mounted on a plate (not shown) extending transversely between the upper surface of the member 20a and the lower portion of the member 30a. Mounted beside the high-speed motor 34 on plate 38a is clutch-brake 40, while mounted on the plate with the slow-speed motor 36 are gear box 42 and clutch-brake 44. (Each of the four clutches used in the apparatus has an associated brake, for selective engagement when the clutch is disengaged. A small air blower, not shown, is trained on each clutch-brake, for cooling.) The two motors are connected drivingly through the clutches mentioned and drive lead screw 32 by means of timing pulleys and timing belts 46 and 47. (All belts throughout the apparatus are timing belts, working on timing pulleys.)

Lead screw 32 is drivingly seated in nut 48, which is dependently secured on small channel member 50, which is in turn secured to longitudinal subtable small channel members 52. The members 52 are secured to transverse structural members 54 carrying transverse slide bearing means 56, the latter being adapted to slide on fixed transverse guide rods 58 mounted on pins 60 secured in transverse angle members 62, 64, and 66 mounted respectively on plates 22, 24, and 26. Transverse bars 68 and 70 secure the longitudinal subtable members 52 to rear portion 72 of the table, so that the table and its immediate substructure will move together as a unit pursuant to rotation of the lead screw 32. The front portion 74 of the table is mounted pivotally about a transverse axis relative to the rear portion 72, about shaft 76. The front portion 74 of the table is selectively pivoted about shaft 76, as will be seen, by piston type actuators 78 carried by strap 80 carried in turn by subtable members 52.

Two longitudinal- or in-feed screws 82 and 84 are rotatably ball-bearingly mounted at their back ends in bearing members 86 carried by angle iron members 88 mounted on longitudinal channel members 18b and 20b, and toward their front ends in bearing members 90 carried by plate 24. The screws 82 and 84 are selectively driven by a high-speed in-feed motor 92 or a low-speed in-feed motor 94. The high-speed motor 92 is mounted on plate 96 secured atop longitudinal member 18a, and is connected through pulleys and belt 98 to clutch-brake 100 also mounted on plate 96. Low-speed motor 94 is mounted on longitudinal member 20a, on which are also mounted, drivingly connected therewith, gear box 102 and clutch 104. The low-speed motor 94 is connected through these and pulleys with high-speed motor 92 by belt 106, which also drivingly joins so that they will always rotate in unison the two longitudinal lead screws 82 and 84. Such rotation drives nuts 108, and upwardly projecting bar 110 extending therebetween and secured thereto, which is positioned between pairs of rollers 112 rotatably mounted dependently on drive members 114, upwardly extending fingers 116 of which include holes through which extend pins 117. Each of the two transversely spaced drive members 114 includes a longitudinally directed ball-bearing guide hole which is movable along longitudinal guide rods 118 carried beneath longitudinal subtable members 52.

The pins 117 each extend through a hole in one of feed drive rods 120, the front ends of which are pivotally secured to a feed subassembly 121 best shown in FIG. 8. This subassembly includes a transversely extending vertical plate 122 secured to a pair of vertical plates 124, which are connected at their lower portions by narrow plate 126. The frontmost portion of the table portion 74 is provided with a multiplicity of blind slots 128 through which extend metal pads 130 with a surface roughly coplanar with that of the upper surface 132 of the front portion of the table. The latter is provided along one longitudinal edge with an upturned portion 134 of height corresponding to the rims 136 and 138 extending along substantially the entire longitudinal edge of the other side of the table. Rollers 140 carried by plates 124 roll on the portion 134 and rim 136 as the stock feed subassembly is moved back or forward by the drive rods 120 responsive to rotation of the longitudinal feed screws 82 and 84. Mounted on the plate 122 are a multiplicity of feed clamp grip cylinders 142 for downwardly urging grips 144 toward pads 130 for selectively clamping a stack of sheets of impregnated fabric therebetween.

Another gripping subassembly, the cutting hold or stock clamp subassembly, is best shown in FIG. 7. This subassembly, indicated generally at 149, includes a lower hydraulic housing 150 extending transversely across the front of the table portion 74, and operatively secured thereto through member 152. Mounted on enclosure 150 at each transverse end thereof is a plate 154, on each of which is dependently mounted a cylinder 156, the two cylinders 156 being actuatable in unison to raise or lower piston members 158, which are secured to opposed transverse ends of upper hydraulic housing 160, which is thereby moved upwards and downwards in vertical slots 162 in guide members 164. Secured in aligned holes in the upper and lower hydraulic enclosures are a corresponding multiplicity of slidable plungers 166, all of the same cross-sectional area. Pairs of O-ring gaskets 168 around each of the plungers 166 seal against fluid escape. The holes in the upper enclosure 160 are all in communication with zone 170, while the holes in which the plungers move in lower enclosure 150 are all in communication with lower zone 172. The zones 170 and 172 are in turn in communication, as shown diagrammatically, through flexible member 174. Supported dependently on upper enclosure member 160 by means of headed screws 176 in counterbored holes shown in upper grip bar 178, against the upper edge of which the lower ends of the upper plungers or pistons 166 rest, the heads of the fasteners 176 being spaced from the member 160 to permit predetermined limited vertical travel on the part of the upper grip bar 178. A lower grip bar 180 is similarly mounted relative to lower enclosure 150 and its pistons 166 by means of fasteners 182 working with counterbored holes in the lower grip bar to provide for similar plunger contact thereacross and for limited vertical movement.

Associated with transverse lead screw 32 are a cooperating discriminator subassembly and stop subassembly.

The discriminator subassembly, indicated generally at 200, is mounted on lonigtudinal member 28a. Plate 202 is secured to said member 28a, extending thereabove frontwardly of the discriminator subassembly, and carries the bearing member for one transverse end of the lead screw 32. To the end of the lead screw member is attached timing belt pulley 204, which is connected through timing belt 206 to another such pulley 208, mounted on shaft 210 carried by bifurcated bearing member 212 mounted on the member 28a. Mounted on shaft 210 is hub 214, to which is secured for rotation therewith (but slight lost motion relative thereto) and with said shaft discriminator disk 216, in which are a multiplicity of holes 218 spaced equal angular distances apart and with their centers lying on a circle in turn centered on the axis of the shaft 210. Carried within the bearing member 212 in alignment with the holes 218 as the latter rotate thereby is a photoelectric unit 220 including a photocell and a light source. Mounted on the bearing member rearwardly thereof is a brake support 222 in which are mounted a pair of transversely spaced limitedly transveresly pivotable (relative to the bearing member) vertical bars 224, urged toward each other by means of spring 226. Inwardly spaced from each of said bars is a flat spring member 228 extending parallel thereto and also secured at its lower end to the support 222, each said spring being secured at a place transversely spaced from its associated bar 224. At their upper ends, each bar 224 and associated spring member 228 is spaced apart by bushing 230, the shank of which rests loosely in the respective bar 224. Inwardly extending from the upper portion of each spring member 228 is a fiber member 229 which presses against the disk 216 and serves as a brake thereof.

The stop subassembly, indicated generally at 248, is at the other end of the transverse lead screw 32, and is mounted on plate 250 carried by longitudinal member 30a. It is best shown in FIGS. 9 and 9b. Mounted on the end of lead screw 32 for rotation therewith is stop wheel 252, which includes a multiplicity of transverse peripheral notches in which are detachably secured by means of radial screws (not shown) a corresponding multiplicity of dogs 254 to define therebetween relieved portions. Slidably mounted for longitudinal movement of its double-beveled tip 256 into and out of the spaces or relieved portions between said dogs is slide or pawl 258, actuated by pressure in cylinder 260. Stop member 262 carried by said slide cooperates with limit switch 264 to actuate the latter. The slide 258 is secured against movement toward the stop wheel 252 when ratchet lock slide 266 is upwardly positioned, as shown in FIG. 9b, by the bias of spring 267a and by friction, as will be seen. Actuation of solenoid 268 moves core 270 and bell crank lever 272 against the bias of spring 267b to move lock slide 266 downwardly out of the notch 269 in the slide so that the latter may pursuant to actuation by piston 260 move toward the stop wheel 252. The tip of bell crank lever 272 initially moves freely in slot 271 with core 270, whereby inertia level is built up whereby when the tip hits the end of the slot 271 the spring pressure (and friction accentuated by the pressure being exerted in cylinder 260) holding the latch in the pawl notch is quickly overcome.

The mechanical punch press indicated generally at 10 includes a downwardly urgable press member 280 and an upwardly directed Walker-type die 282 positioned therebeneath. The die 282 is rotatable about a vertical axis responsive to rotation of gear 284 through idler gear 286 by gear 288, the latter being rotated between positions 270 degrees apart by the air motor 290, which is a product sold under the trademark Rotac by Ex-Cell-O Corporation, Greenville, Ohio, and in turn rotating the die 282 180 degrees therebetween, so that successive rows of transverse cuts may be interlocked as shown in FIG. 5. Limit switches 292 and 294 cooperate with cam 296 secured to the shaft of the air motor 290 at points corresponding to the 270 degrees rotation.

The pneumatic system employed with this apparatus is indicated diagrammatically in FIG. 11. That system includes a supply line 400 through which compressed air is supplied through a filter 402, regulating valve 404, and lubricator 406 to supply air to line 408 at a pressure of about 60 p.s.i. A second regulating valve 410 supplies air to line 412 at a pressure of about 40 p.s.i.

Connected to line 408 is a first valve 414 which supplies air under pressure to stock clamp cylinders 156 as controlled by solenoid 416; a second valve 418 which controls the application of air pressure to feed clamp cylinders 142 as controlled by solenoid 420; and a third valve 422 which supplies air under pressure to the cylinders of table actuators 78 under the control of solenoid 424; four-way solenoid valve 426 which supplies air to die positioning motor 290 under the control of solenoids 428 and 430; and valve 432 which controls the application of the air to single-cycle clutch cylinder 433 under the control of solenoid 434. Compressed air supplied over line 412 is applied through four-way solenoid valve 436 to cross-feed pawl control cylinder 260, controlled by solenoids 438 and 440; and through four-way solenoid valve 442 for application to infeed pawl cylinder 443 as controlled by solenoids 445 and 446.

The circuitry for operating the apparatus is shown in FIGS. 12a, 12b, and 12c. Electrical power (220-volt three phase) is applied over line 500 through switch 502 and contacts 504–1 to operate main punch drive motor 506 and rotate main shaft 507. A relay coil 504, connected across two of the phases, is controlled by a punch press motor start push button 508 and a stop push button 510. When start push button 508 is depressed, relay coil 504 is energized, closing contacts 504–1 to energize the motor 506, and contacts 504–2 to provide a holding circuit across the start push button 508. Depression of stop push button 510 de-energizes relay 504 to open the contacts. Three-phase power is supplied to cross-feed motors 34 and 36 through contacts 512–1 and 514–1, while the three-phase power is supplied to the infeed drive motors 92 and 94 through contacts 516–1 and 518–1. Also, single phase power is supplied through transformer 520 to the control circuitry.

That control circuitry includes a main control relay 522 which is connected across the supply lines 524, 526 and in series with a power-on push button 528–1, power-off push button contacts 530–1 and three limit switches 532, 534, and 536. Main control relay holding contacts 522–1 are connected in parallel with power-on contacts 528–1.

In a circuit connected across the control power lines 524, 526 is included a timer coil 538.

Main conrol contacts 522–2 and 522–3 connect lines 524 and 526 to lines 550 and 552, respectively, when relay coil 522 is energized. Connected across lines 550 and 552 are a cycle start push button 554 and a normally closed cycle stop push button 556 in series with control relay 561. Connected in series with the motor control relay 512 are its normally closed contacts 512–2, limit switch contacts 294–1 (in parallel with holding contacts 512–3 and normally closed contacts 570–1) and die position control push button contacts 580–1. A similar die position control push button has contacts 582–1 similarly connected in series with motor control relay 514. Limit switch 584, which is operated when pressure is applied to open the stock clamp cylinders 156 is connected in series with motor ccontrol relay coil 518. Two low-voltage sensitive pilot relays 586 and 588 are also connected across lines 550 and 552.

The circuitry includes five counters 591–595. Counter 591 is responsive to signals from the cross-feed sensing photocell 220 of cross-feed discriminator 200, which may also be selectively transferred by the contol circuitry to step counter 593. Counter 594 is stepped by signals from the infeed discriminator photocell 589, and stepping pulses may alternatively be applied from that photocell to counter 595 through the control circuitry. Counter 592 is stepped by a count-out pulse from counter 591.

There are also included in the control circuitry solenoids 610, 612, 614 and 616 whicch control the clutches 40, 44, 100 and 104, respectively. Also, there is a selective cross-feed speed control push buton having two sets of contacts 618–1 and 618–2, a cross-feed selector switch 620, and die reposition control push button contacts 580–2 and 582–2.

When switch 502 is closed to apply power to the main lines, the start push button 508 may be depressed, energizing relay 504, closing holding contacts 504–2 and motor control contacts 504–1 to supply three-phase 220 volt 60 cycle power to the motor 506 circuitry and energize transformer 520.

Figure 12:
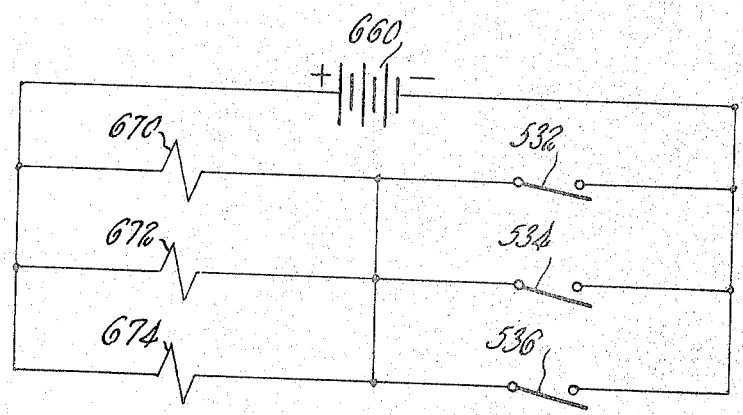

The power-on push button 528 is then depressed, and energizes relay 522 to apply single-phase power to the main control circuit lines 550 and 552. With the circuitry in the position shown in FIGS. 12 (consisting of FIGS. 12a, 12b and 12c), the infeed motors 92 and 94 are thereby energized to rotate in back direction, i.e., to selectively drive feed assembly 121 in the back direction (away from the punch press) through energization of relay coil 516 and the cross-feed motors 34 and 36 will be energized in the left direction (i.e., to selectively drive nut 48 left in plan view as in FIG. 2) through energization of relay 512. (It will be noted that the operator may press either the left-drive push button 582 or the right-drive push button 580 to close contacts 582–2 or 580–2, respectively, and energize the die reposition solenoids 428 or 430 to cause the die 282 to be repositioned.) Also, with the depression of the power-on push button the contacts in the counter circuits operated by switch 528 are opened and all the counters are re-energized and reset. (The counter 592 also has manual stepping and resetting controls 622 and 624, respectively. This counter controls the number of punches in a "row" and the counter may be set to the number of pieces already punched by the press, for example.) The two photocells 220 and 589 and their associated equipment are also energized by the power-on push button 528. The infeed pawl is at this stage engaging the teeth of the infeed stop wheel and thus locking the infeed screws, and the cross-feed pawl 256 is retracted. The stock clamp solenoid 416 is energized through the normally closed contacts 567–5, to close the stock clamp. The feed clamp solenoid 420 is de-energized and the feed clamp is open.

The cycle start button 554 may then be pressed, and relays 561, 562, and 563 are energized. With the energization of relay 563, its contacts 563–4 close and energize solenoid 268 to withdraw ratchet lock slide 266 and allow pawl 256 to advance to lock the transverse screw 32. (Solenoid 268 is de-energized when stop 262 releases limit switch 264 opening contacts 264–2; closing at the same time of contacts 264–1 sets up an enabling circuit for solenoids 438–440.) When the pawl 256 engages stop wheel 252, pilot relay 586 contacts the stop wheel and causes contacts 586–1 to close, and (as contacts 563–4 and 561–3 have been closed) the solenoid 434 is energized to operate the one-cycle clutch of punch press 10. As the press starts down, it closes contacts 598–1 of limit switch 598 to energize relay 568 (resetting counter 591 through contacts 568–1), closing contacts 568–7, and when the press completes its cycle, opens contacts 598–1 and closes limit switch contacts 598–2 to energize relay 569.

When relay 569 is energized, it opens contacts 569–1 and de-energizes relay 563, causing solenoids 438–440 to be energized to retract pawl 256, whereupon lock slide 266, biased by springs 267a and 267b, locks it in position. When stop 262 engages limit switch 264, contacts 264–1 are opened and 264–2 close, respectively, to de-energize solenoids 438–440 and set up an enabling circuit for solenoid 268. The energization of relay 569 de-energizes relay 562, with the result that contact 562–2 close, energizing upon de-contact of pilot relay 586 the high-speed clutch solenoid 610 for the high-speed clutch 40 so that the high-speed cross-feed motor 34 drives the transverse shaft leftwardly. As the shaft rotates, the discriminator disk 216 interrupts the light beam and the photocell 220 produces pulses which step counter 591.

At a predetermined count (warning) contacts 591–1 close and energize relay 562. This energization de-energizes the solenoid 610 and energizes the low-speed clutch-brake solenoid 612 so that the low-speed motor 36 drives the shaft at a reduced speed. When the counter 591 counts out, contacts 591–2 close. With the closing of contacts 591–2, relay 563 is energized. Counter 592 also receives a count pulse at this time. With the energization of relay 563, a circuit is completed to energize solenoid 268 and release pawl 256 to lock the transverse shaft. The engagement of the pawl with the stop wheel opens contacts 586–2, de-energizing the clutch-brake solenoid 612 and closes contacts 586–1 so that the punch press solenoid 434 is energized and the punch press cycles.

When the table reaches the end of the row (counter 592 counts out), relay 564 is energized during the punch operation. As contacts 564–4 are then opened, solenoids 438–440 are not energized and therefore pawl 256 is not retracted (in other words the transverse shaft remains locked). Contacts 564–2 also operate to couple the output of photocell 220 to counter 593. The infeed drive is enabled through contacts 564–3.

The de-energization of relay 563 however closes contacts 563–5 and as contacts 564–5 are closed, relay 570 is energized, as switch 620 is closed. The energization of relay 570 opens contacts 570–1 and de-energizes the relay 512 to open contacts 512–1, de-energizing the cross-feed drive in the left direction. The circuitry also energizes relay 571 and its contacts close to energize solenoid 430 and drive the die positioning motor 290 to reposition the die. This opens limit switch contacts 292–2 and closes the switch contacts 294–2. This operation also closes limit switch contacts 292–1 and as relay 512 is de-energized relay 514 is energized and closes contacts 514–1 to operate the cross-feed motors in the left direction. With relay 571 energized, contacts 571–2 close and as contacts 512–4 are open and 514–4 are closed, a circuit energizing the solenoids 438–440 for retracting pawl 256 is completed and that pawl is retracted, releasing the transverse lead screw. The photocell 220 produces pulses which step counter 593 until that counter steps out at which time relays 562 and 565 are energized. At the same time relay 571 also energizes the infeed pawl retract solenoids 445–446 (contacts 571–7), permitting the rotation of the infeed shafts in a detailed sequence like that for the transverse stop mechanism and involving pilot relay 588 and high speed clutch solenoid 614. The photocell 589 then produces pulses which step counter 594. Counter 594 closes contcts 594–1 to energize relay 566 and transfer from the high-speed drive (clutch 100) solenoid 614 to the low-speed drive (clutch 104) solenoid 616. When the counter 594 counts out, its contacts 594–2 close, energizing relay 567 and infeed pawl latch solenoid 444 is energized through contacts 567–2 to let the pawl move in and lock the shafts. When this occurs, pilot relay contacts 588–1 open to release the low-speed drive clutch 104 and engage its associated brake and feed clamp solenoid 420 is energized upon closing of contacts 588–2 to close the feed clamp cylinders 142. The application of pneumatic pressure to close the feed clamp operates pressure-responsive switch 600 to de-energize the stock clamp solenoid 416 and this in turn closes pressure-responsive switch 584 to energize relay 518 (as contacts 567–1 have been previously opened de-energizing relay 516). Thus, the infeed drive motors are reversed and the infeed pawl is retracted by solenoid 445–446 (contacts 518–5 closing) and the drive circuitry. Relay 566 having been de-energized, movement out of pilot relay 588 causes the high-speed clutch solenoid 614 to be energized, and the feed assembly and cloth are driven toward the punch press. A first limit switch 602 is contacted to energize relay 566 which transfers control through the low-speed solenoid to clutch 104 and then a second limit switch 604 is contacted which energizes relay 573. That relay (contacts 573–1) energizes solenoid 444 and releases the infeed pawl to advance and lock the infeed shaft and operate contact 588–1 and 588–2 de-energizing the drive. Contacts 573–5 also close to energize the stock clamp solenoid 416, and when that closes, the relay 574 is energized to operate the punch press solenoid 434.

The punch press initially energizes relay 568, causing counters 591, 593, 594 and 595 to be reset and then energizes relay 569 which in turn causes the de-energization of relays 565, 566, 567, 570, 571, 573 and 574 and motor control relay 518. With that relay dropping out, the other infeed control relay 516 is energized to reverse the infeed motors. The cross-feed pawl 256 is retracted to allow the transverse shaft to rotate and the table steps across the row as above described. The feed clamp is opened when the counter 594 or 595 last in operation is reset.

When counter 592 counts out again and the punching cycle is completed, die position control relay 572 is energized rather than relay 571 due to the position of the limit switches 292 and 294, and the die is repositioned. The energization of relay 572 closes contacts 572–9, which transfers the photocell pulses to counter 595 for control of the infeed according to its setting. The counter and circuitry operates otherwise in the same manner.

*Summary of operation*

The electro-mechanical operation, in sequence, of the apparatus may now be summarized.

At the beginning of the operation as here described, a stack of sheets S of resin-impregnated cotton duck (of weight and character suitable for manufacture therefrom, for example, box toe blanks for shoes) is placed on the table (indicated generally at T, and made up of portions 72 and 74), the edge of the stack being stopped against rim portions 136 and 138 (FIG. 2, left side of table, viewing with punch press 10 at top of drawing; when the word "left" is used in connection with table movement or the overall apparatus in this application, it refers to this direction, and "forward" means toward the press 10, "back" meaning away therefrom). Enough fabric overhangs the front of table T for a first row of blanks to be cut out (see FIG. 13). The table T is, as shown in FIG. 2, at its extremity of travel in a right-hand direction. The front part 74 of the table is horizontal (as shown in FIG. 6). The die 282 is, as shown in FIG. 4, in position so that limit switch 294 is depressed by cam 296. The vertically movable punch press member 280 is in upward or retracted position, with protuberances 650 of cam 652, rotated with punch press main shaft 507, depressing limit switch 598.

With switch 502 closed, the operator now pushes press start button 508 and power-on start button 528–1, whereupon: the punch press motor 506 begins running; a red pilot light, not shown, is energized; the four table drive motors 34, 36, 92, and 94 begin running; the five counters 591, 592, 593, 594, and 595 are energized and reset; the photocells 220 and 589 are energized; feed clamp solenoid 420 is energized to admit air pressure to hold the feed clamp open; stock clamp solenoid 416 is energized to admit air pressure to hold the stock clamp closed and gripping the stack of fabric sheets S transversely thereacross; photocell 220 is in circuit to deliver counts to counter 591; infeed pawl solenoid 446 acts to supply pressure urging the infeed pawl, already engaging the stop wheel of the infeed stop mechanism 654, thereagainst to preclude feed clamp longitudinal movement; and solenoid 440 applies pressure within cylinder 260 to drive cross-feed pawl 256 away from stop wheel 252.

As the notch 269 of the cross-feed pawl moves over lock slide 266, springs 267a and 267b urge the lock slide upwardly thereinto, and as stop 262 then engages limit switch 264, the solenoids 438–440 reverse the direction of pressure in cylinder 260, to immediately urge pawl 256 toward stop wheel 252, lock slide 266 acting as a latch and alone preventing movement into engagement with the stop wheel.

After allowing sufficient time for the photocells to warm up, the operator pushes cycle start button 554–1, which energizes solenoid 268 to pull latch (or lock slide) 266 out of notch 269, whereupon the pressure already built up in cylinder 260 drives pawl 256 toward stop wheel 252 at great speed. (As pawl 256 moves toward the cross-feed stop wheel, the stop 262 soon releases limit switch 264, which thereupon de-energizes latch retract solenoid 268, so that latch 266 is ready to engage notch 269 the next time the pawl is retracted.)

When the pawl tip engages the stop wheel 252, pilot relay 586 is urged thereagainst, whereupon: low-speed cross-feed motor clutch 44 is disengaged (and the brake portion thereof at the same time acts to brake the clutch to overcome further torque owing to clutch inertia); through solenoid 434 the single revolution clutch of punch press 10 is engaged to inaugurate a punching cycle; and through solenoid 424 the pressure is taken off table cylinders 78. As the press member 280 descends, cam 652 rotatably carried by the main shaft 507 of the punch press immediately disengages limit switch 598, whereupon counter 591 (which counts out between punches in a row) is reset. (Counters 593, 594, and 595 are also reset at this time, although this is without practical significance except after a feeding cycle, hereinafter described.) The punch member 280 toward the end of its downward travel engages the top of the stack of sheets S, and continues downwardly until it has engaged the die 282 (see FIG. 6), having meantime cut out and driven through the hollow die 282, for removal through a chute therebelow (not shown), a stack of counters of the shape of die 282 (see FIG. 4). As press member 280 in its continued downward travel urges sheets of fabric toward the top of the stack nearer the die 282, front table portion 74 drops therewith, pivoting about shaft 76, as seen in FIG. 13, so that pulling and tearing on the top sheets (which must if the table front were stationary somehow else manage the vertically downward distance not required to be travelled by the bottom sheets, already just above the die) are avoided.

When, at the end of the punch stroke, cam 652 again engages limit switch 598, solenoid 424 is again energized to valve air to again exert pressure in table cylinders 78 to bring the front portion 74 back to the horizontal, and the direction of pressure is changed by solenoid 440 to drive cross-feed pawl 256 again away from stop wheel 252. In addition to the sequence of events that follow with respect to pawl control, as above described, disengagement from the stop wheel of pilot relay 586 causes engagement of clutch 40 of high-speed cross-feed motor 34, to drive the table to the left at its higher cross-feed speed. Rotation (through engagement of the high-speed clutch 40) of lead screw 32 rotates through timing belt 206 and shaft 210, discriminator disk 216, to rotate holes 218 therearound to provide counts (corresponding to predetermined very small increments of table travel for sensitivity of control settings) through photocell 220 or pulses to counter 591. When the table has completed most of the transverse travel desired to reposition it for a new punch, a preset warning count is reached in counter 591, whereupon the high-speed cross-feed clutch 40 is disengaged and the low-speed cross-feed motor 36 clutch 44 is engaged, so that the table may "walk" into its final position without undue inertia. When this final position is signalled by a full counting out to a preset figure of counter 591, solenoid 268 is energized to withdraw latch 266, whereupon the pawl 256 is fired into the stop wheel 252 at great speed.

The counting-out of counter 591 also sends a count to counter 592. (Because the count is received by counter 592 at this point in the sequence of operation, it is necessary, before beginning this first row as above described, to press manual count button 622 on counter 592 once to set in a count for the first punch, which was made without a first counting out of counter 591, as has been seen. If start-up is in the middle of a transverse row, this manual count button is actuated a number of times commensurate with the particular middle position. Thus counter 592 is counted out to the proper predetermined count to end the transverse row at the place desired.)

As before, the movement of the pawl inward has the explained effects on pawl controls and upon engagement with the stop wheel (whereupon the pawl tip 256 cooperating with dogs 254 gives positive insurance against further rotation of lead screw 32 and consequent transverse movement of the table, and zeros out any errors to give a constant base for the next count) disengaging the low-speed cross-feed clutch (and putting on its brake), and initiating another punching cycle, all beginning and following through in the manner already described.

Successive punches are thus taken across the width of the stack of sheets S, repeating the already-described sequence again and again, until, as the position for taking the last punch in the row is reached, counter 592 counts out. This results, even while the punch cycle simultaneously initiated is being carried through, in: shifting the output of photocell 220 from counter 591 to counter 593; and overriding the circuitry that would through solenoids 438–440 after an ordinary punch in a transverse row reverse the direction of air pressure in cylinder 260 to cause withdrawal of the pawl 256 at the end of the punching cycle.

Then, upon completion of this last-in-the row punching cycle: die reposition control solenoid 430 is energized to rotate die 282 (through the gears shown in FIG. 4); and infeed pawl solenoids 445–446 are energized to reverse direction in which air pressure is exerted on the infeed pawl.

Although the infeed stop and discriminator assemblies 604 and 606 are not shown in detail, they are identical in detailed construction and operation with the correspondingly named cross-feed assemblies. Thus, withdrawal of the infeed pawl results in first latching by an identical spring-biased latch (the control solenoid 444 for which is de-energized at this point), and then engaging limit switch 658 (corresponding to limit switch 264) to reverse through solenoids 445–446 once more the direction in which air pressure urges the infeed pawl. As with the cross-feed arrangement and its pilot relay, when pilot relay 588 on the infeed pawl moves out of contact with the infeed stop wheel, the high-speed infeed motor clutch 100 is engaged, causing the feed clamp assembly 121 to be driven at a higher speed back away from the punch end of the table. This rotates the infeed discriminator wheel, to send pulses from photocell 589 to counter 594. When counter 594 reaches a warning count, clutch 100 is disengaged, and low-speed clutch 104 is engaged to "walk" the feed clamp assembly into its back position. Counter 594 is preset to make this a distance corresponding to the amount of stock, longitiudinally, required for the next new row of punches. When counter 594 counts out, the infeed pawl latch solenoid 444 is energized to withdraw it, whereupon the infeed pawl is fired into the infeed stop wheel; with engagement of pilot relay 588, clutch 104 is disengaged (and its brake portion activated, to prevent adverse clutch inertial effects on lead screws 82 and 84 and through them discriminator assembly 606) and feed clamp solenoid 420 acts to valve air into cylinders 142 to cause grips 144 to be urged toward pads 130 to clamp the stack S therebetween. When feed clamp assembly 121 thus closes, responsive to pressure-responsive switch 600 stock clamp solenoid 416 valves air pressure in a direction in cylinders 156 to open stock clamp assembly 149, whereupon upon actuation of pressure-responsive switch 584 the direction of rotation of the infeed motors is reversed and pressure direction is reversed by solenoids 445–446 to withdraw the infeed pawl. Disengagement of the pawl pilot relay 588 engages the high-speed infeed motor clutch, starting the feed clamp assembly forward once more, gripping the stack and sliding it forward over the smooth surface of the table. On its forward trip, the feed clamp assembly is not under the control of the counter. Rather, a pair of longitudinally spaced limit switches 602 and 604 carried by frame channel 18a are successively engaged by cam surfaces (not shown) dependent from cross bar 110, to successively shift from the high speed infeed clutch to the low speed infeed clutch and then cause the infeed pawl latch to retract, letting the infeed pawl be driven in to cause disengagement (with braking) of the infeed low-speed clutch. Actuation of the final setting limit switch 604 (which assures always feeding to the same point) also acts through solenoid 416 to change the direction in which pressure acts in cylinders 156 and close the stock clamp 149.

Meantime, cross-feed movement has gone on. The die rotation (caused at the same time the infeed pawl was withdrawn to begin the feed cycle) results in engagement by cam 256 of limit switch 292, to reverse the direction of the cross-feed motors and retract the cross-feed pawl (in the mode of operation already described) to engage the high speed cross-feed clutch. (The cross-feed motors would not have reversed their direction of rotation at this time had the setting of position switch 620 been the opposite. As indicated in FIG. 5, the first punch in alternate rows is at the same transverse location, but for maximum stock economy, alternate tows should be slightly staggered. The setting of position switch 620 depends on the transverse direction, in which the table must be moved to get to the desired place for the first punch on a succeeding row.) When counter 593, responsive to rotation of the cross-feed discriminator wheel, counts to warning, the high speed cross-feed clutch is disengaged and the low speed cross-feed clutch engaged. When counter 593 counts out, the cross-feed pawl is advanced in the mode already described, except that upon engagement of the pilot relay 586 not only is the low-speed clutch disengaged (and braked), but photocell 220 is switched back from counter 593 to counter 591.

All the above being complete, when the stock clamp 149 closes, limit switch 606 energizes punch press solenoid 434 and table solenoid 424 for a first punching cycle in the new row. Resetting of counter 594 (or 595 if the most recent infeed was under its control) at this time causes the feed clamp to open again.

The remainder of the punches in this row go forward in the manner already described, except that table travel is for this row to the right instead of to the left, counter 591 working equally in both directions.

When, at the end of this second row, counter 2 again counts out: die reposition solenoid 430 rotates the die back into position depressing limit switch 294; and the output of photocell 589 is shifted to counter 595, which is preset with warning and final position counts, and functions also, for feeding distance control, like counter 594. (Two feeding counters 594 and 595 are needed to provide for feeding a different distance for successive rows, when desired to further minimize waste, while keeping feeding distance constant for alternate rows.)

Had operation begun at a point in the overall cycle at which initial row travel movement to the right, rather than left, had been desired, the operator would have pushed "reverse" push button 580–2, to reposition the die and reverse the direction of rotation of the cross-feed motors.

As a safety measure, timer 538, which is energized by cycle start push button 554–1 and reset by each counting out of counter 591, shuts down the entire system if more than a predetermined time passes before it is preset, and insures against accidentally leaving power on for any substantial length of time.

The entire system is also shut down as a safety measure by actuating both cross-feed brakes and the infeed low-speed brake if any one of limit switches 532, 534, and 536 is actuated. If any one of these limit switches is actuated, the machine is in a failure condition, and shutdown is needed to prevent hurling the table or feed subassembly across the room. All three of these limit switches also work in a separate circuit (FIG. 12c) with battery 660 to provide braking through brake control solenoids 670, 672, and 674 in the event there should be an outside power failure coupled with a failure condition in the machine.

Other embodiments within the following claims will of course occur to those skilled in the art.

I claim:
1. Apparatus useful in the manufacture of flat cutout elements such as shoe box toe blanks and counters which comprises
a frame,
a generally horizontal table for supporting sheet material operatively supported on said frame for transverse movement relative thereto,
a material feeder mounted for transverse movement with said table and longitudinal movement relative thereto,
transverse drive means for driving said table relative to said frame,
longitudinal drive means for driving said feeder relative to said table,
transverse sensing means operatively responsive to said transverse movement,
transverse stop means operatively responsive to said transverse sensing means to selectively stop said transverse movement,
longitudinal sensing means operatively responsive to said longitudinal movement, and
longitudinal stop means operatively responsive to said longitudinal sensing means to selectively stop said longitudinal movement.

2. The apparatus of claim 1 which includes
a generally horizontal subframe, said subframe being spaced away from said table therebeneath,
spacing means spacing said subframe beneath said table and securing said subframe to said table for longitudinal and transverse movement therewith,
a multiplicity of transversely extending guide rods carried by said frame,
a multiplicity of bearings carried by said subframe and slidable on said guide rods,
a transversely extending lead screw, and
a nut carried by said subframe and cooperating with said transversely extending lead screw to drive said subframe and therewith said table transversely responsive to rotation of said lead screw.

3. The apparatus of claim 2 in which said table includes a front portion and a back portion, said front portion being pivotal about a horizontal transverse axis relative to said back portion, and in which said spacing means secure said subframe to said back portion, said subtable and at least one of said guide rods extending beneath said front portion.

4. The apparatus of claim 3 which includes means cooperating with said front portion and said frame to permit said front portion to selectively pivot downwardly about said axis and to selectively return said front portion to a generally horizontal positon.

5. The apparatus of claim 1 in which said material feeder comprises
   upper grip support means extending transversely across said table thereabove,
   lower grip carrying means extending transversely across said table therebelow,
   spacing means for securing in vertically spaced relation corresponding ends of said upper grip support means and said lower grip carrying means,
   at least one selectively actuable upper grip mounted on said upper grip support means for selective movement toward said lower grip carrying means,
   and a lower grip corresponding to each said upper grip, each said lower grip being carried on said lower grip carrying means, extending through a longitudinally extending slot in said table, and having an upper surface generally coplanar with the upper surface of said table.

6. The apparatus of claim 5 which includes at least one longitudinal lead screw rotatably mounted in said frame,
   threaded means cooperating with said longitudinal lead screw to be driven longitudinally pursuant to rotation thereof, and
   at least one drive rod extending generally alongside said table, said drive rod being operatively secured to said threaded means and said spacing means whereby said upper grip and lower grip are longitudinally moved together and with said threaded means.

7. The apparatus of claim 6 which additionally includes
   a transversely extending guide secured to said threaded means for longitudinal movement therewith,
   a generally horizontal subframe secured beneath said table and transversely movable on transversely extending slide rods carried by said frame,
   at least one longitudinally extending slide rod secured beneath said subframe and in spaced relation thereto,
   drive means including an upper portion secured to an end of said drive rod, a lower portion cooperative with said transversely extending guide for transverse movement thereover, and intermediate longitudinal bearing means accepting and movable along said longitudinally extending slide rod.

8. The apparatus of claim 1 which includes along a transverse end of said table a selectively operable stock clamp.

9. The apparatus of claim 8 in which said stock clamp includes upper and lower transversely extending grip bars, said upper grip bar being selectively generally vertically actuable by power means operatively carried by said table, and the upper surface of said lower grip bar being generally in the plane of the surface of said table.

10. Apparatus useful in the manufacture of flat cutout elements such as shoe box toe blanks and counters which comprises
    a frame,
    a generally horizontal table for supporting sheet material operatively supported on said frame for transverse movement relative thereto,
    a material feeder mounted for transverse movement with said table and longitudinal movement relative thereto,
    transverse drive means for driving said table relative to said frame,
    longitudinal drive means for driving said feeder relative to said table,
    transverse sensing means operatively responsive to said transverse movement,
    transverse stop means operatively responsive to said transverse sensing means to selectively stop said transverse movement,
    longitudinal sensing means operatively responsive to said longitudinal movement,
    longitudinal stop means operatively responsive to said longitudinal sensing means to selectively stop said longitudinal movement, and a stock clamp carried by said table adjacent an end thereof,
    said clamp comprising
    a first transversely-extending elongated housing,
    a second correspondingly transversely-extending elongated housing,
    power means connecting the corresponding ends of said housing and adapted to urge said housings together,
    a first grip bar carried by said first elongated housing for limited movement relative thereto toward and away from said second housing,
    a second grip bar carried by said second housing for limited movement relative thereto toward any away from said first grip bar and first housing,
    a corresponding plurality of pistons of corresponding cross-sectional area carried by said first and second elongated housings, said pistons of one elongated housing being movable toward and away from the other said elongated housing, said first and second elongated housing pistons respectively engaging said first and second grip bars, said pistons at their ends away from said grip bars being in communication with respectively a first elongated housing manifold and a second elongated housing manifold, and
    flexible means providing communication between said manifolds.

11. Apparatus useful in the manufacture of flat cutout elements such as shoe box toe blanks and counters which comprises
    a frame,
    a generally horizontal table for supporting sheet material operatively supported on said frame for transverse movement relative thereto,
    a hollow die having an upwardly directed cutting edge in a plane generally coplanar with the surface of said table and defining a configuration to be given said elements,
    a press member selectively downwardly movable to force said material against said die to cut out said elements,
    a material feeder mounted for transverse movement with said table and longitudinal movement relative thereto,
    transverse drive means for driving said table relative to said frame,
    longitudinal drive means for driving said feeder relative to said table,
    transverse sensing means operatively responsive to said transverse movement,
    transverse stop means operatively responsive to said transverse sensing means to selectively stop said transverse movement,
    longitudinal sensing means operatively responsive to said longitudinal movement, and
    longitudinal stop means operatively responsive to said longitudinal sensing means to selectively stop said longitudinal movement.

12. Apparatus of claim 1 in which at least one said stop mechanism comprises
    a pawl having a stop element engagement portion and selectively movable between a retracted position and an advanced position,
    a stop element carrying a multiplicity of relieved portions and movable past said pawl responsive to movement of a portion of said apparatus, said relieved portions each thereof being adapted to cooperate with said stop element engagement portion of said pawl to prevent further movement of said relieved portions when said pawl is in advanced position and engaging one of said relieved portions, pressure means to urge said pawl under pressure toward said stop element while said pawl is in retracted position, and a latch cooperating with said pawl to hold the same away from said stop wheel in retracted position despite said pressure means, said latch being selectively withdrawable from said pawl to permit high-speed movement of the pawl into a relieved portion of said stop element.

13. The apparatus of claim 12 in which at least one of said drive means is a lead screw and in which said stop mechanism and a discriminator mechanism are mounted at generally opposed portions of said frame in cooperative relation with said lead screw but associatively with opposite ends thereof, said stop element being mounted on an end of said lead screw for rotation thereby, and said discriminator mechanism including a discriminator disk rotatably mounted on said frame and driven by said lead screw through lost motion means.

14. Apparatus useful in the manufacture of flat cutout elements such as shoe box toe blanks and counters which comprises
a frame,
a generally horizontal table for supporting sheet material operatively supported on said frame for transverse movement relative thereto,
a material feeder mounted for transverse movement with said table and longitudinal movement relative thereto,
transverse drive means for driving said table relative to said frame,
longitudinal drive means for driving said feeder relative to said table,
transverse sensing means operatively responsive to said transverse movement,
transverse stop means operatively responsive to said transverse sensing means to selectively stop said transverse movement,
longitudinal sensing means operatively responsive to said longitudinal movement, and
longitudinal stop means operatively responsive to said longitudinal sensing means to selectively stop said longitudinal movement,
at least one of said sensing means comprising
a discriminator member movable responsive to movement of a portion of said apparatus,
sensing means cooperating with said discriminator member to signal the extent of said movement, and
lost motion means to decouple said discriminator member from inertially induced forces when the rate of said movement is changed.

15. Apparatus useful in the manufacture of flat cutout elements such as shoe box toe blanks and counters which comprises
a punch press,
a frame,
a generally horizontal table operatively supported on said frame for supporting sheet material for transverse movement relative to said frame and said punch press,
a material feeder mounted for transverse movement with said table and longitudinal movement relatvie thereto and to said punch press,
transverse drive means for driving said table relative to said frame,
longitudinal drive means for driving said feeder relative to said table,
transverse sensing means operatively responsive to said transverse movement,
transverse stop means operatively responsive to said transverse sensing means to selectively stop said transverse movement,
longitudinal sensing means operatively responsive to said longitudinal movement, and
longitudinal stop means operatively responsive to said longitudinal sensing means to selectively stop said longitudinal movement.

16. The apparatus of claim 15 which includes five counters,
said transverse sensing means including a discriminator signalling said transverse movement in pulses and first and second counters separately and selectively receiving said transverse movement pulses,
said longitudinal sensing means including a discriminator signalling said longitudinal movement in pulses and third and fourth counters separately and selectively receiving said longitudinal movement pulses,
and a fifth counter receiving pulses from said first counter responsive to each counting out of the latter,
said first counter being presettable to govern the transverse distance between successive punches in a transverse row,
said fifth counter being presettable to institute a longitudinal feed cycle,
said second counter being presettable to adjust the transverse position for the first punch in a succeeding row for maximum material savings and interlocking with first row punches,
said third counter being presettable to determine the amount of longitudinal feed on alternate feed cycles, and
said fourth counter being presettable to determine the amount of longitudinal feed on other and also alternate feed cycles.

17. The apparatus of claim 16 which includes a limit switch actuable by said feeder to end said feed cycles.

18. The apparatus of claim 17 which includes a further limit switch actuable by said feeder to switch said drive means from a driven relation to a high speed motor to a driven relation with a low speed motor.

References Cited

UNITED STATES PATENTS

| | | | |
|---|---|---|---|
| 1,080,047 | 12/1913 | Calleson | 83—396 X |
| 1,560,918 | 11/1925 | Stubgen | 83—219 X |
| 2,834,413 | 5/1958 | Jaakkola | 83—220 |
| 2,854,114 | 9/1958 | Hillyer et al. | 192—143 |
| 3,047,117 | 7/1962 | Stephan | 192—143 X |
| 3,072,003 | 1/1963 | Sirugue | 83—396 X |
| 3,072,834 | 1/1963 | Mottu | 192—143 X |
| 3,129,622 | 4/1964 | Pearce | 83—569 X |
| 3,163,087 | 12/1964 | Crowe et al. | 192—143 |
| 3,174,370 | 3/1965 | Thumim | 83—71 |

WILLIAM W. DYER, JR., *Primary Examiner.*

JAMES M. MEISTER, *Examiner.*